Figure 1:
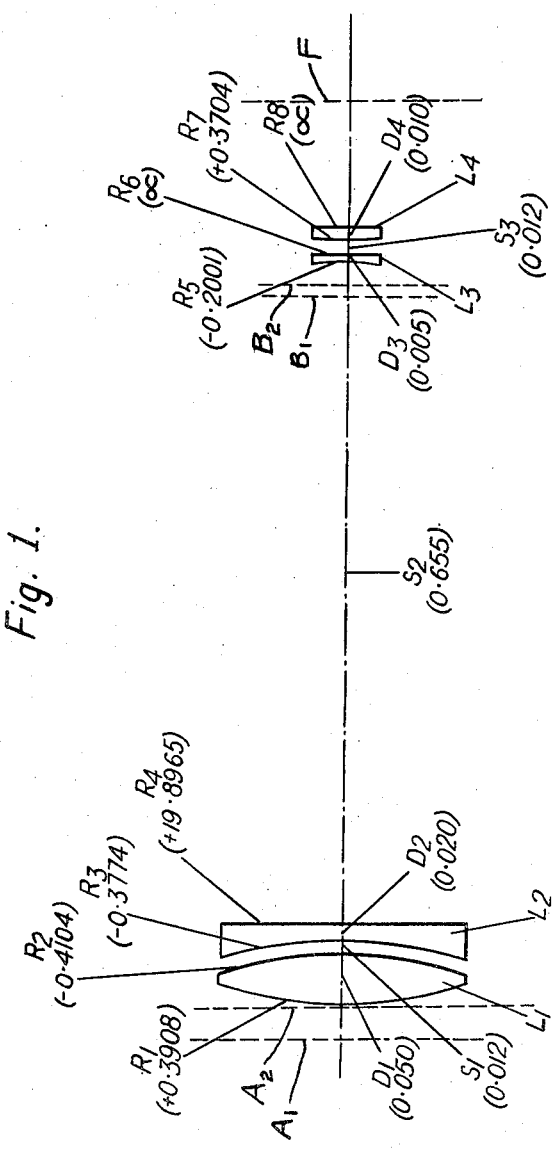

April 29, 1958 G. H. COOK 2,832,263
TELEPHOTO OBJECTIVES

Filed March 1, 1957 3 Sheets-Sheet 1

Inventor
Gordon H. Cook

April 29, 1958

G. H. COOK 2,832,263

TELEPHOTO OBJECTIVES

Filed March 1, 1957

3 Sheets-Sheet 3

Inventor
Gordon H. Cook

United States Patent Office 2,832,263
Patented Apr. 29, 1958

2,832,263

TELEPHOTO OBJECTIVES

Gordon Henry Cook, Leicester, England, assignor to Taylor, Taylor & Hobson Limited, Leicester, England, a company of Great Britain Application March 1, 1957, Serial No. 643,348

Claims priority, application Great Britain March 6, 1956

19 Claims. (Cl. 88—57)

This invention relates to an objective of the telephoto type intended for photographic purposes requiring a fairly large equivalent focal length compared with the size of the negative to be covered.

When the angular field to be covered by an objective is very small, the use of simple achromatic doublets or triplets of the type used in telescopes may prove satisfactory, but when a somewhat larger, but still fairly small angular field such for example as 3 degrees is to be covered, such constructions prove unsatisfactory as they give rise to significant field curvature and astigmatism. Furthermore, the known forms of anastigmat constructions, which are usually suitable for use with a comparatively large angular field, are rather bulky and complex, and when having a fairly large equivalent focal length often fail to provide adequate aberration correction with a fairly small angular field. In order to provide a photographic objective giving adequate correction over a fairly small angular field, but an angular field sufficiently large to necessitate good correction of astigmatism and field curvature, the use of a telephoto construction has been proposed.

The object of the present invention is to provide such a telephoto objective, well-corrected for all the primary aberrations and for higher order aberrations over the angular field which it is to cover (less than 5 degrees semi-angular field), while also being fairly simple and compact so that in particular, the distance between its front vertex and its focal plane is less than its equivalent focal length.

It should be made clear, that the terms "front" and "rear" as used hereinafter, are to be understood to refer respectively to the side of the longer conjugate and to the side of the shorter conjugate, in accordance with the usual convention.

A telephoto objective, corrected for chromatic and spherical aberrations, coma, astigmatism, field curvature and distortion, according to the present invention, comprises a convergent front member having an equivalent focal length ($f_1$) lying between .75 F and 1.00 F, where F is the equivalent focal length of the whole objective, and a divergent rear member consisting of at least one convergent element and at least one divergent element and having an equivalent focal length whose numerical value lies between 0.55 F and 1.75 F, the front member comprising a convergent component, whose equivalent focal length lies between 0.22 F and 0.6 F, axially spaced in front of a divergent component by a distance lying between 0.003 F and 0.08 F, and the back focal distance of the objective being less than 0.3 times the axial separation of the two members.

The axial distance between the rear nodal plane of the rear member and the focal plane of the objective for an infinitely distant object is preferably less than 0.6 times the axial distance between the adjacent nodal planes of the two members.

The numerical value of the equivalent focal length of the rear member preferably lies between 0.75 $f_1$ and 1.75 $f_1$.

The equivalent focal length of the front component of the front member preferably lies between 0.3 $f_1$ and 0.6 $f_1$, and between 7 and 70 times the axial separation between the two components of the front member.

Preferably, the front surface of the front convergent component of the front member has a radius of curvature lying between 0.33 $f_1$ and 0.66 $f_1$, such surface being convex to the front. The rear surface of such component preferably has a radius of curvature not less than the radius of curvature of the front surface of the divergent component of such member, both such surfaces being concave to the front with radii of curvature preferably lying between 0.33 $f_1$ and 0.8 $f_1$. The curvature of the rear surface of such divergent component is preferably numerically less than 0.2 times the equivalent power of the whole objective. The front convergent and the rear divergent components of the front member are preferably each constituted by a simple element.

The rear member may consist of a single compound component, but preferably consists of at least two axially spaced components.

Thus, such rear member may comprise a simple divergent component axially spaced in front of a simple convergent component, the air space between these components being wider at the margin than along the axis. In this case, the rear surface of the front component of such rear member may have a curvature numerically less than 0.5 times the equivalent power of the whole objective, whilst the rear surface of the rear component may have a curvature numerically less than 0.33 times such equivalent power.

Three practical examples of telephoto objective according to the invention are shown respectively in Figures 1, 2 and 3 of the accompanying drawings, and numerical data for such examples are given in the tables set forth hereinafter, in which $R_1$, $R_2$ . . . represent the radii of curvature of the individual surfaces counting from the front (the positive sign indicating that the surface is convex to the front and the negative sign that it is concave thereto), $D_1$, $D_2$ . . . represent the axial thicknesses of the individual elements, and $S_1$, $S_2$ . . . represent the axial air separations between the individual components. The tables also give the mean refractive index $n_d$ (for the d-line) and the Abbé V number of the glass used for each element.

The insertion of equals (=) signs in the radius columns of the tables, in company with plus (+) and minus (—) signs which indicate whether the surface is convex or concave to the front, is for conformity with the usual Patent Office custom, and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radius indicated for example as positive in the tables may have to be treated as negative for some calculations as is well understood in the art.

Example I

[Equivalent focal length (F) 1.00. Relative aperture F/4.0.]

| Radius | Thickness or Air Separation | Refractive Index $n_d$ | Abbé V Number |
|---|---|---|---|
| $R_1 = +0.3908$ | | | |
| | $D_1 = 0.050$ | 1.5722 | 57.7 |
| $R_2 = -0.4104$ | | | |
| | $S_1 = 0.012$ | | |
| $R_3 = -0.3774$ | | | |
| | $D_2 = 0.020$ | 1.6535 | 33.5 |
| $R_4 = +19.8965$ | | | |
| | $S_2 = 0.655$ | | |
| $R_5 = -0.2001$ | | | |
| | $D_3 = 0.005$ | 1.5722 | 57.7 |
| $R_6 = \infty$ | | | |
| | $S_3 = 0.012$ | | |
| $R_7 = +0.3704$ | | | |
| | $D_4 = 0.010$ | 1.6535 | 33.5 |
| $R_8 = \infty$ | | | |

Example II

[Equivalent focal length (F) 1.00. Relative aperture F/5.6.]

| Radius | Thickness or Air Separation | Refractive Index $n_d$ | Abbé V Number |
|---|---|---|---|
| $R_1 = +0.4318$ | | | |
| | $D_1 = 0.0283$ | 1.61452 | 56.22 |
| $R_2 = -0.5397$ | | | |
| | $S_1 = 0.0150$ | | |
| $R_3 = -0.4830$ | | | |
| | $D_2 = 0.0205$ | 1.70035 | 30.28 |
| $R_4 = +22.8379$ | | | |
| | $S_2 = 0.6848$ | | |
| $R_5 = -0.2014$ | | | |
| | $D_3 = 0.0050$ | 1.51507 | 56.35 |
| $R_6 = +3.7353$ | | | |
| | $S_3 = 0.0145$ | | |
| $R_7 = +0.3861$ | | | |
| | $D_4 = 0.0070$ | 1.70035 | 30.28 |
| $R_8 = \infty$ | | | |

Figure 2:
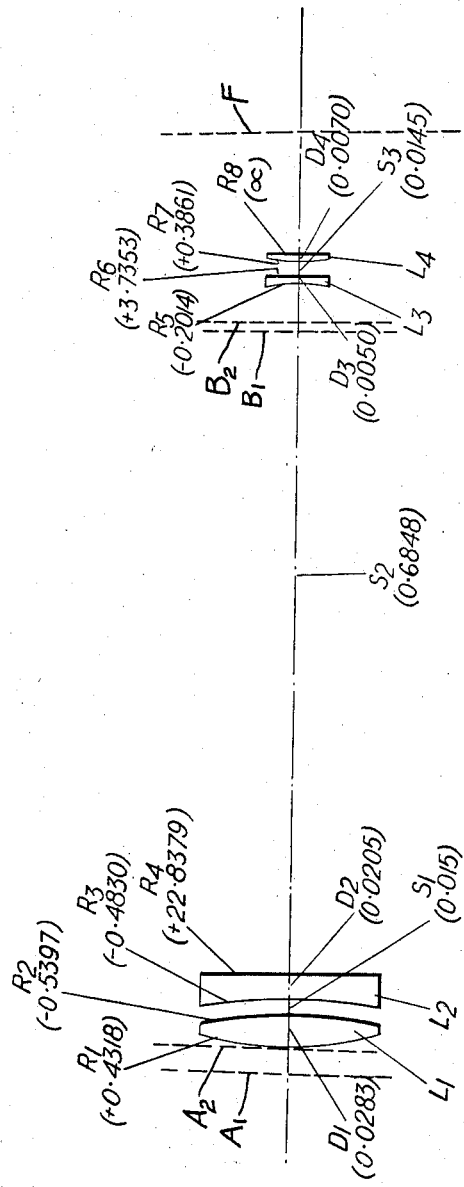

It will be seen from Figures 1 and 2 and from these tables that in each of these examples the objective consists of a front member consisting of two axially spaced single elements $L_1$, $L_2$, and a rear member consisting of two axially spaced single elements $L_3$, $L_4$.

In each example the objective is well-corrected for primary and higher order aberrations, especially higher order spherical and chromatic aberrations and coma, and covers a semi-angular field of 1½ degrees, the objective in both examples having a back focus of 0.120 F.

In the first example, shown in Figure 1, the equivalent focal length $f_1$ of the convergent front member is 0.854 F, while the divergent rear member has an equivalent focal length 0.982 F which is approximately equal to 1.15 $f_1$. The positions of the front and rear nodal planes $A_1$ and $A_2$ of the front member are respectively 0.028 F in front of the surface $R_1$ and 0.081 F in front of the surface $R_4$, whilst the positions of the front and rear nodal planes $B_1$ and $B_2$ of the rear member are respectively 0.026 F in front of the surfaces $R_5$ and 0.049 F in front of the surface $R_8$. Thus the axial distance between the rear nodal plane $B_2$ of the rear member and the focal plane F of the objective for an infinitely distant object is 0.169 F, while the axial distance between the adjacent nodal planes $A_2$ and $B_1$ of the two members is 0.710 F, the ratio of the former to the latter having an approximate value of 0.238. The equivalent focal length of the convergent front component $L_1$ of the front member is 0.358 F.

The radius of curvature of the front surface $R_1$ of the component $L_1$ has a value of 0.459 $f_1$, that of the rear surface $R_2$ of such component 0.481 $f_1$, and that of the front surface $R_3$ of the component $L_2$ 0.441 $f_1$. The curvature of the rear surface $R_4$ of the divergent component $L_2$ has a value approximately 0.052 times the equivalent power of the whole objective.

In the second example, shown in Figure 2, the equivalent focal length $f_1$ of the convergent front member is 0.872 F, whilst the equivalent focal length of the divergent rear member is 1.256 F, which is approximately equal to 1.44 $f_1$. The four nodal planes $A_1$, $A_2$, $B_1$ and $B_2$ of the two members, reading from the front to the rear, are respectively .025 F in front of the surface $R_1$, .067 F in front of the surface $R_4$, .040 F in front of the surface $R_5$ and .064 F in front of the surface $R_8$. Thus the axial distance between the rear nodal plane $B_2$ of the rear member and the focal plane F of the objective for an infinitely distant object is 0.184 F, while the axial distance between the adjacent nodal planes $A_2$ and $B_1$ of the two members is 0.712 F, so that the ratio of the former to the latter is 0.258. The equivalent focal length of the convergent front component $L_1$ is 0.395 F.

Also in the second example, the radius of curvature of the surface $R_1$ is 0.494 $f_1$, that of the surface $R_2$ is 0.618 $f_1$, and that of the surface $R_3$ is 0.553 $f_1$. The curvature of the rear surface $R_4$ of the divergent component $L_2$ has a value approximately 0.044 times the equivalent power of the whole objective.

In both examples, the curvature of the rear surface $R_8$ of the rear component $L_4$ is zero, whilst the curvature of the rear surface $R_6$ of the component $L_3$ is also zero in the first example but has a positive value of 0.262 times the equivalent power of the whole objective in the second example.

In the first example, the distance from the front vertex of the objective, i. e. the axial point on the front surface of the objective, to the rear focal plane F of the objective is approximtely 0.885 F, the corresponding distance in the second example being 0.895 F, so that in each case, the objective, in addition to being of a simple construction, is also quite compact and can be accommodated in a small housing.

The clear diameter of the front member is 0.25 F in Example I and 0.179 F in Example II, whilst that of the rear member is 0.068 F in Example I and 0.060 F in Example II.

It is, however, to be appreciated that the invention is not limited to constructions having four axially spaced elements, and the rear member may include one or more compound components.

Figure 3:
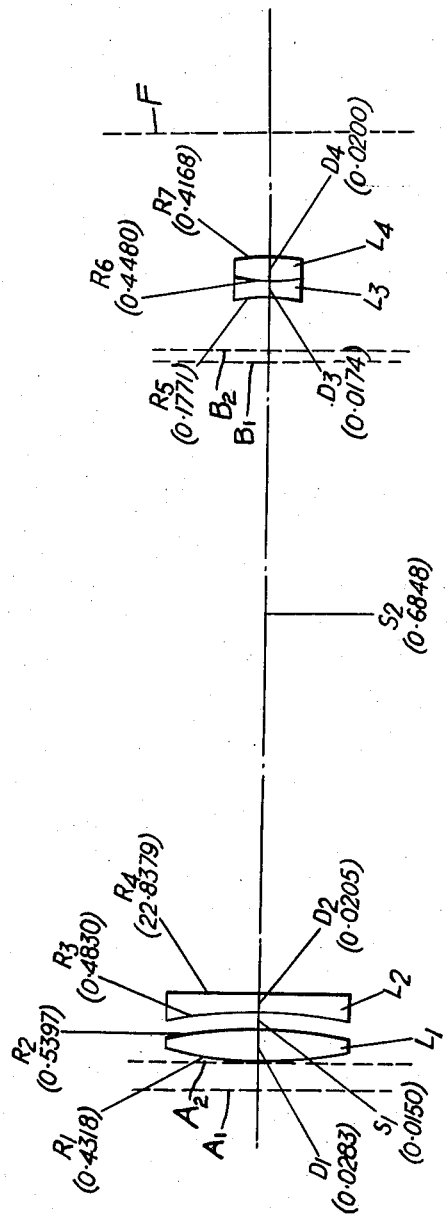

Thus the following table refers to an objective in which the rear member is constitued by a single compound component as shown in Figure 3.

Example III

[Equivalent focal length (F) 1.00. Relative aperture F/5.6.]

| Radius | Thickness or Air Separation | Refractive Index $n_d$ | Abbé V Number |
|---|---|---|---|
| $R_1 = +0.4318$ | | | |
| | $D_1 = 0.0283$ | 1.6145 | 56.22 |
| $R_2 = -0.5397$ | | | |
| | $S_1 = 0.0150$ | | |
| $R_3 = -0.4830$ | | | |
| | $D_2 = 0.0205$ | 1.70035 | 30.28 |
| $R_4 = +22.8379$ | | | |
| | $S_2 = 0.6848$ | | |
| $R_5 = -0.1771$ | | | |
| | $D_3 = 0.0174$ | 1.5151 | 56.35 |
| $R_6 = +0.4480$ | | | |
| | $D_4 = 0.0200$ | 1.7000 | 41.18 |
| $R_7 = -0.4168$ | | | |

As shown in Figure 3, the objective in this example consists of a front member consisting of two axially spaced single elements $L_1$, $L_2$ and a rear member consisting of a single compound component having two cemented elements $L_3$, $L_4$.

The objective is well-corrected for primary and higher order aberrations and covers a semi-angular field of 1½ degrees the back focal distances being 0.120 F.

The equivalent focal length of the front member is 0.872 F, whilst that of the rear member is −1.256 F, the numerical ratio of the latter to the former being approximately 1.44. The front and rear nodal planes $A_1$ and $A_2$ of the front member respectively lie 0.025 F in front of the surface $R_1$ and 0.067 F in front of the surface $R_4$, whilst the front and rear nodal planes $B_1$ and $B_2$ of the rear member respectively lie 0.063 F in front of the surface $R_5$ and 0.090 F in front of the surface $R_7$. The axial distance between the rear nodal plane $B_2$ of the rear member and the focal plane F of the objective for an infinitely distant object is thus 0.210 F, while the axial distance between the adjacent nodal planes $A_2$ and $B_1$ of the two members is 0.689 F, the ratio of the former to the latter having an approximate value of 0.305. The equivalent focal length of the convergent front component $L_1$ is 0.395 F.

The radius of curvature of the front surface $R_1$ of the component $L_1$ has a value of 0.495 $f_1$, that of the rear surface $R_2$ of such component 0.620 $f_1$, and that of the front surface $R_3$ of the component $L_2$ 0.554 $f_1$. The curvature of the rear surface $R_4$ of the divergent component $L_2$ has a value approximately 0.044 times the equivalent power of the whole objective.

As in the first two examples, the objective in this example is quite compact, the distance from the front vertex of the objective to the rear focal plane F being approximately 0.806 F.

The clear diameter of the front member is 0.179 F and that of the rear member is 0.61 F.

It is to be appreciated that the objectives above described can be modified in various ways within the scope of the invention. For example the components of the front member may be compound if desired.

What I claim as my invention and desire to secure by Letters Patent is:

1. A telephoto objective corrected for chromatic and spherical aberrations, coma, astigmatism, field curvature and distortion, and comprising a convergent front member having an equivalent focal length ($f_1$) lying between 0.75 F and 1.00 F, (where F is the equivalent focal length of the whole objective) and a divergent rear member consisting of at least one convergent element and at least one divergent element and having an equivalent focal length whose numerical value lies between 0.55 F and 1.75 F, the front member comprising a convergent component whose equivalent focal length lies between 0.22 F and 0.6 F and a divergent component axially spaced to the rear of such convergent component by a distance lying between 0.003 F and 0.08 F, and the back focal distance of the objective being less than 0.3 times the axial separation of the two members.

2. A telephoto objective as claimed in claim 1, in which the axial distance between the rear nodal plane of the rear member and the focal plane of the objective for an infinitely distant object is from zero to 0.6 times the axial distance between the adjacent nodal planes of the two members.

3. A telephoto objective as claimed in claim 2, in which the numerical value of the equivalent focal length of the rear member lies between 0.75 $f_1$ and 1.75 $f_1$.

4. A telephoto objective as claimed in claim 3, in which the equivalent focal length of the front component of the front member lies between 0.3 $f_1$ and 0.6 $f_1$, and between 7 and 70 times the axial separation between the two components of the front member.

5. A telephoto objective as claimed in claim 4, in which the front surface of the front convergent component of the front member is convex to the front and has radius of curvature lying between 0.33 $f_1$ and 0.66 $f_1$ and the radius of curvature of the rear surface of the front convergent component of the front member is not less than the radius of curvature of the front surface of the rear divergent component of the front member, both of such surfaces being concave to the front with radii of curvature lying between 0.33 $f_1$ and 0.8 $f_1$.

6. A telephoto objective as claimed in claim 5, in which the front convergent and the rear divergent components of the front member are each constituted by a simple element.

7. A telephoto objective as claimed in claim 6, in which the rear member comprises a simple divergent component and a simple convergent component axially spaced to the rear of such divergent component, the air space between these components being wider at the margin than along the axis.

8. A telephoto objective as claimed in claim 1, in which the axial distance between the rear nodal plane of the rear member and the focal plane of the objective for an infinitely distant object is from zero to 0.6 times the axial distance between the adjacent nodal planes of the two members, the equivalent focal length of the front component of the front member lying between 0.3 $f_1$ and 0.6 $f_1$, and between 7 and 70 times the axial separation between the two components of the front member.

9. A telephoto objective as claimed in claim 8, in which the rear member consists of a single compound component.

10. A telephoto objective as claimed in claim 8, in which the rear member comprises a simple divergent component and a simple convergent component axially spaced to the rear of such divergent component, the air space between these components being wider at the margin than along the axis.

11. A telephoto objective as claimed in claim 1, in which the numerical value of the equivalent focal length of the rear member lies between 0.75 $f_1$ and 1.75 $f_1$.

12. A telephoto objective as claimed in claim 1, in which the equivalent focal length of the front component of the front member lies between 0.3 $f$ and 0.6 $f_1$, and between 7 and 70 times the axial separation between the two components of the front member.

13. A telephoto objective as claimed in claim 1, in which the front surface of the front convergent component of the front member is convex to the front and has radius of curvature lying between 0.33 $f_1$ and 0.66 $f_1$.

14. A telephoto objective as claimed in claim 1, in which the radius of curvature of the rear surface of the front convergent component of the front member is not less than the radius of curvature of the front surface of the rear divergent component of the front member, both of such surfaces being concave to the front with radii of curvature lying between 0.33 $f_1$ and 0.8 $f_1$.

15. A telephoto objective as claimed in claim 1, in which the curvature of the rear surface of the rear component of the front member is numerically less than 0.2 times the equivalent power of the whole objective.

16. A telephoto objective as claimed in claim 1, in which the front convergent and the rear divergent components of the front member are each constituted by a simple element.

17. A telephoto objective as claimed in claim 1, in which the rear member consists of a single compound component.

18. A telephoto objective as claimed in claim 1, in which the rear member consists of at least two axially spaced components.

19. A telephoto objective as claimed in claim 18, in which the rear member comprises a simple divergent component and a simple convergent component axially spaced to the rear of such simple divergent component, the air space between these components being wider at the margin than along the axis, whilst the curvature of the rear surface of such divergent component is numerically less than 0.5 times the equivalent power of the whole objective, and the curvature of the rear surface of such convergent component is numerically less than 0.33 times such equivalent power.

References Cited in the file of this patent

UNITED STATES PATENTS

| | | |
|---|---|---|
| 1,156,743 | Booth | Oct. 12, 1915 |
| 2,239,538 | Richter | Apr. 22, 1941 |
| 2,390,387 | Rayton et al. | Dec. 4, 1945 |
| 2,421,927 | Cox | June 10, 1947 |
| 2,514,591 | Shopal | July 11, 1950 |
| 2,631,497 | Schlegel | Mar. 17, 1953 |

FOREIGN PATENTS

| | | |
|---|---|---|
| 587,761 | Great Britain | May 5, 1947 |